United States Patent
Eiter et al.

(10) Patent No.: US 12,502,027 B2
(45) Date of Patent: Dec. 23, 2025

(54) METHOD FOR TREATING PRODUCTS TO BE COOKED, AND DOMESTIC COOKING APPLIANCE

(71) Applicant: BSH Hausgeräte GmbH, Munich (DE)

(72) Inventors: Hans-Martin Eiter, Kirchweidach (DE); Stefan Schürf, Siegsdorf (DE)

(73) Assignee: BSH Hausgeräte GmbH, Munich (DE)

( * ) Notice: Subject to any disclaimer, the term of this patent is extended or adjusted under 35 U.S.C. 154(b) by 708 days.

(21) Appl. No.: 17/279,109

(22) PCT Filed: Oct. 8, 2019

(86) PCT No.: PCT/EP2019/077159
§ 371 (c)(1),
(2) Date: Mar. 24, 2021

(87) PCT Pub. No.: WO2020/074474
PCT Pub. Date: Apr. 16, 2020

(65) Prior Publication Data
US 2021/0386239 A1  Dec. 16, 2021

(30) Foreign Application Priority Data

Oct. 9, 2018  (DE) .................... 10 2018 217 207.2
Oct. 18, 2018  (DE) .................... 10 2018 217 811.9

(51) Int. Cl.
*A47J 36/32*  (2006.01)
*A23L 5/10*  (2016.01)
(Continued)

(52) U.S. Cl.
CPC ............... *A47J 36/32* (2013.01); *A23L 5/15* (2016.08); *F24C 7/046* (2013.01); *F24C 7/087* (2013.01);
(Continued)

(58) Field of Classification Search
CPC .......... A47J 36/32; F24C 7/046; F24C 7/087; G01D 13/00; G01N 33/02; A23V 2002/00
See application file for complete search history.

(56) References Cited

U.S. PATENT DOCUMENTS 5,361,681 A * 11/1994 Hedstrom ............... F24C 7/087
219/490
2010/0187224 A1* 7/2010 Hyde ..................... H05B 6/688
219/720
(Continued)

FOREIGN PATENT DOCUMENTS

| DE | 102014113664 A1 | 3/2016 |
| DE | 102014114901 A1 | 4/2016 |
| DE | 102017101183 A1 | 7/2018 |

OTHER PUBLICATIONS

National Search Report DE 102018217207.2 dated Sep. 9, 2019.
International Search Report PCT/EP2019/077159 dated Dec. 11, 2019.

*Primary Examiner* — Steven N Leff
(74) *Attorney, Agent, or Firm* — Michael E. Tschupp; Andre Pallapies; Brandon G. Braun

(57) ABSTRACT

In a method for treating food to be cooked in a household cooking appliance, a sensor measures a local distribution of a surface condition of the food to be cooked. A measure of deviation is calculated from the measured local distribution and multiple local power distributions that are known in advance in the region of the food to be cooked in correspondence with different sets of setting values of a unit for treating the food to be cooked. A unit for treating the food to be cooked is operated by using the set of setting values of the one of the power distributions for which the measure of deviation fulfills a predetermined criterion.

20 Claims, 3 Drawing Sheets

(51) Int. Cl.
*F24C 7/04* (2021.01)
*F24C 7/08* (2006.01)
*G01K 13/00* (2021.01)
*G01N 33/02* (2006.01)

(52) U.S. Cl.
CPC .............. *G01K 13/00* (2013.01); *G01N 33/02* (2013.01); *A23V 2002/00* (2013.01)

(56) References Cited

U.S. PATENT DOCUMENTS

| | | |
|---|---|---|
| 2013/0186887 A1 | 7/2013 | Devito |
| 2014/0026762 A1* | 1/2014 | Riefenstein ............. F24C 7/085 99/325 |
| 2014/0203012 A1* | 7/2014 | Corona ..................... A23L 5/15 219/704 |
| 2017/0074522 A1* | 3/2017 | Cheng .................... F24C 7/085 |

* cited by examiner

METHOD FOR TREATING PRODUCTS TO BE COOKED, AND DOMESTIC COOKING APPLIANCE

CROSS-REFERENCES TO RELATED APPLICATIONS

This application is the U.S. National Stage of International Application No. PCT/EP2019/077159, filed Oct. 8, 2019, which designated the United States and has been published as International Publication No. WO 2020/074474 A1 and which claims the priority of German Patent Applications, Serial No. 10 2018 217 207.2, filed Oct. 9, 2018 and Serial No. 10 2018 217 811.9, filed Oct. 18, 2018, pursuant to 35 U.S.C. 119(a)-(d).

BACKGROUND OF THE INVENTION

The invention relates to a method for treating food to be cooked in a household cooking appliance having a cooking compartment, at least one unit for treating the food to be cooked and at least one sensor for determining at least one surface condition of the food to be cooked in which a local distribution of at least one surface condition of the food to be cooked is measured by means of at least one sensor. The invention also relates to a household cooking appliance having a cooking compartment, at least one unit for treating the food to be cooked, at least one sensor for determining at least one surface condition of the food to be cooked, at least one evaluating facility and a control facility for controlling the at least one unit for treating the food to be cooked, wherein the household cooking appliance is configured for the purpose of implementing the method. The invention can be advantageously used in particular on a household cooking appliance in the form of an oven with or without additional functionalities, specific to the treatment of food to be cooked with a uniform degree of browning and/or a uniform temperature distribution on its surface.

DE 10 2014 113 664 A1 discloses a cooking appliance having a cooking compartment in which food can be cooked and having a source of radiation that can output the radiation that can be utilized to cook the food. Moreover, at least one sensor is provided that can detect parameters of the food to be cooked, in particular shine, brightness, position, size, browning and/or degree of browning of the food to be cooked. Moreover, a controller is provided that controls at least the power of the radiation source in dependence upon the detected parameters in such a manner that the food to be cooked obtains locally a desired state by targeted application of heat into the food to be cooked and/or into an accessory part, which the food to be cooked is arranged on. Moreover, a method for cooking food is described.

EP 0 563 698 A2 discloses a cooking system having a cooking region having adjusting elements that can be set in order to change relevant parameters that determine the cooking procedure of a foodstuff. A camera monitors the cooking region and controls a processor using information regarding the operating conditions in the cooking region. The processor is allocated to a storage apparatus that stores typical cooking programs that in each case comprise a different combination of process parameters. The processor reacts to the incoming data in order to select the most suitable from the stored cooking programs, wherein said processor compares its parameters with the corresponding information from the camera in order to control the adjusting elements using respective error signals. The cooking procedure is controlled in a fully automatic manner on the basis of the actual conditions of the food to be cooked.

DE 10 2014 114 901 A1 discloses a cooking appliance having a cooking compartment in which food can be cooked, a sensor that can detect variable parameters of the food to be cooked and/or the environment of the food to be cooked, and a controller that can evaluate the signals that are detected by the sensor. Moreover, a method for detecting a process parameter of a cooking process is described.

DE 10 2017 101 183 A1 discloses a method for operating a cooking appliance and also a cooking appliance in which food to be cooked is heated in a cooking compartment using a heating facility. The food to be cooked is detected using a camera facility. At least one parameter of the food to be cooked is determined with the aid of the procedure for detecting the food to be cooked. In this case, the heating facility comprises a heat source having a plurality of heating means that can be controlled separately. A spatial segment of a plurality of spatial segments in the cooking compartment is heated in a targeted manner in each case using at least one heating means. The control of the separate heating means is assumed in dependence upon the parameter of the food to be cooked.

The object of the present invention is to at least in part overcome the disadvantages of the prior art and in particular to provide a constructive particularly simple possibility for producing a desired distribution of the surface characteristic, in particular a uniform surface characteristic, of food to be cooked that is located in the cooking compartment.

BRIEF SUMMARY OF THE INVENTION

This object is achieved in accordance with the features of the independent claims. Advantageous embodiments are the subject matter of the dependent claims, the description and the drawings.

The object is achieved by a method for treating food to be cooked in a household cooking appliance having a cooking compartment, at least one unit for treating the food to be cooked and at least one sensor for determining at least one surface condition of the food to be cooked in which a) a local distribution of at least one surface condition of the food to be cooked is measured by means of at least one sensor, b) a respective measure of deviation is calculated from the measured distribution of the at least one surface condition and multiple local power distributions that are known in advance in the region of the food to be cooked, wherein the power distributions that are known in advance correspond to different sets of setting values of the at least one unit for treating the food to be cooked, and c) the at least one unit for treating the food to be cooked is operated using the set of setting values of the power distribution and the measure of deviation of said power distribution fulfills at least one predetermined criterion.

As a consequence, the advantage is achieved that in a particularly precise manner and using only little or even practically without any constructive additional outlay it is possible to set the at least one surface characteristic of the food to be cooked. In particular, food to be cooked can therefore be treated in such a way that said food obtains a high degree of uniform distribution of the surface characteristic. The concept of the operation of the at least one unit for treating the food to be cooked in accordance with the set of the power distribution of setting values, the measure of deviation of which fulfills at least one predetermined criterion, is based on a prognosis of the expected development of the surface condition under the new set of setting values.

The measured distribution of the at least one surface condition can also be referred to below as the "measured distribution".

Step b) can also be understood in such a manner that the measured distribution is compared with multiple local power distributions that are known in advance in the region of the food to be cooked and a respective measure of deviation is calculated as a result of the comparison. The measure of deviation is therefore provided from a linkage of values of the measured distribution to a respective local power distribution that is known in advance.

In one embodiment, the at least one surface condition comprises a degree of browning or another color change of the food to be cooked, a surface temperature and/or a surface moisture of the food to be cooked. The use of the other color change as a surface condition can be expedient for example for foods to be cooked that do not typically experience any browning or are not to experience browning, for example vegetables, peas or broccoli.

In one development, the household cooking appliance is an oven. In one development, the oven can have an additional microwave function and/or steam treatment function. The household cooking appliance can alternatively be a microwave appliance that in one development has at least one IR radiation heating body and/or one steam treatment function.

The unit for treating the food to be cooked is in particular a unit or component of the household cooking appliance that is configured for the purpose of treating food to be cooked by physical effect. The unit for treating the food to be cooked can be controlled in particular by means of a control facility of the household cooking appliance. Each unit for treating the food to be cooked has at least one setting parameter having in each case at least two setting values. If it is only possible to set two setting values, in this case for example the settings can be off (for example represented by the value "0") and on (for example represented by the value "1").

In one development, the at least one unit for treating the food to be cooked is an energy introducing unit, in other words that said unit for treating the food to be cooked is configured for the purpose of introducing energy for treating the food to be cooked into the cooking compartment, for example heat radiation or microwaves. In this case, the associated energy distribution or power distribution is typically spatially or locally inhomogeneous in the cooking compartment. The expression "power distribution" can be used synonymously with the expression "energy distribution" below.

In one development, at least one unit for treating the food to be cooked is a unit for introducing material that is configured for the purpose of introducing material intended for local treatment of the food to be cooked into the cooking compartment, for example hot air, cooling air and/or water (for example in the form of water vapor or as spraying mist). Also in this case, the associated energy distribution or power distribution is typically spatially or locally inhomogeneous in the cooking compartment. The local power distributions that are known in advance can be provided beforehand for example by experimental measurements and/or simulation calculations, for example of the manufacturer. The power distributions are in particular not only produced or calculated during the course of the method but rather are stored beforehand in a data storage device (for example of the household appliance, of a network computer or in the so-called "cloud").

The power distributions in the cooking compartment, which have been produced by different units for treating food to be cooked, are generally different. The power distribution can in addition or alternatively also be different for a specific activated unit for treating the food to be cooked in dependence upon the setting values that are selected with regard to the operation of said unit for treating the food to be cooked.

In order to implement the method, in particular at least two sets of setting values of the at least one unit for treating the food to be cooked exist and it is possible by means of said setting values to produce or to set different power distributions in the cooking compartment.

The term "a set of setting values" can in particular be understood as a specific selection of values of the setting parameters of the at least one unit for treating food to be cooked. The set of setting values can also be referred to as the value configuration or "mask".

The measure of deviation can be a single value or a value quantity. The measure of deviation can also be referred to as the measure of similarity. In particular, the measure of deviation is provided in such a manner that a greater value of the measure of deviation corresponds to a greater deviation or a greater difference of the distributions. In particular, a measure of deviation of the value "zero" can correspond to an identical distribution, wherein this in particular relates only to a form of the distribution (for example expressed in percent of a maximum value), not to absolute values of the distributions.

In one development, the measure of deviation is calculated from standardized or dimensionless (for example percentage) measured distributions (for example of a degree of browning) and the energy distribution. This also renders possible a particularly simple comparison of distributions that have different physical variables (surface condition, energy or power) and/or different maximum intensities.

The at least one predetermined criterion can comprise precisely one criterion or multiple criteria (then where applicable in a predetermined sequence or prioritization). It is also possible for multiple different criteria to be provided for different regions of the food to be cooked, for different items of food to be cooked and/or for different spatial regions.

In one development, the measure of deviation fulfills a predetermined criterion if said measure of deviation reaches a predetermined target value or exceeds said predetermined target value (coming from above or from below).

In one embodiment, the at least one predetermined criterion corresponds to the greatest deviation between the compared distributions. As a consequence, a particularly uniform distribution of the surface condition (for example a uniform degree of browning) is rendered possible in a particularly effective manner. In the case of this embodiment, the power distribution that differs the most from or deviates the most from the measured distribution in the group of available predetermined power distributions is therefore determined and set. In this case use if made of the fact that in this case the regions of the food to be cooked that have the low values of the surface condition such as for example less browning (because said regions have been treated with less energy than regions of the food to be cooked having high values of the surface condition) are subsequently treated more intensely (for example heated) than regions of the food to be cooked having high values of the surface condition.

However, at least one predetermined criterion can also be set differently, in particular if the desired (target) measured distribution is not a uniform distribution but rather is a predetermined non-uniform distribution.

In one embodiment, the measure of deviation is a comparative summation or a difference summation between the measured distribution and a power distribution. The measure of deviation can therefore be determined in a particularly simple manner. Moreover, the measure of deviation then represents a particularly reliable possibility for estimating a deviation between two distributions.

In one development, the comparative summation is provided by a multiplication of locally corresponding values of the measured distribution and a power distribution and subsequent addition of the previously-multiplied values. The measure of deviation is then greatest for the distribution that has in terms of value the lowest comparative summation.

In one development, the difference summation is provided from the amounts of a difference of locally corresponding values of the measured distribution and a power distribution and subsequent addition of the previously-determined difference values. The measure of deviation is then greatest for the distribution that in terms of value has the greatest difference sum.

However, the measure of deviation can also be calculated from other linkages of the distributions, in particular from corresponding values of the measured distribution and a power distribution, for example according to the least squares method.

In one development, the measured points of the measured distribution or the power distribution are additionally weighted. This can also be expressed in such a manner that the measured distribution or the power distribution is linked to a weighting distribution. This can also be implemented in such a manner that the weighting distribution has weighting factors as values that in each case are multiplied using the corresponding local distribution values prior to the measure of deviation being determined. The values of the weighting distribution can in particular lie in a range [0; 1]. This development provides the advantage that local characteristics of the food to be cooked such as a typical browning speed can be taken into consideration.

In one embodiment, the at least one unit for treating the food to be cooked comprises at least one unit for treating the food to be cooked from the group having
  at least one electric radiant heating body,
  at least one induction coil,
  at least one microwave facility,
  at least one radiant-oriented cooling air blower,
  at least one radiant-oriented hot air facility and/or
  at least one radiant-oriented water supplying facility.

The advantage is therefore achieved that it is possible using many apparatuses (if provided in the household cooking appliance) to set the surface characteristic separately or in an arbitrary combination in a standardized manner or to another target distribution of the surface characteristic. This in turn increases an effectiveness of the method. A "radiant-oriented apparatus" can be understood in particular as a unit for introducing material and said unit is configured for the purpose of introducing into the cooking compartment at least one locally-limited, oriented flow of material for the local treatment of the food to be cooked.

The at least one electric radiant heating body is used so as to heat the cooking compartment or the food to be cooked in the cooking compartment. The electric radiant heating body can be a respective tubular heating body, alternatively or in addition for example a printed conductor track, a resistance surface heating element, etc. If the household cooking appliance is fitted with at least one electric radiant heating body, the household cooking appliance can be referred to in one development as an oven and the cooking compartment can be referred to as an oven compartment.

The at least one radiant heating body can comprise for example at least one bottom heat heating body for generating a bottom heat or bottom heating function, at least one upper heat heating body for generating an upper heat or upper heating function, at least one grill heating body for generating a grill function (where applicable together with the at least one upper heat heating body), an annular heating body for generating hot air or a hot air function, etc. The setting parameter of a radiant heating body can comprise in particular different electric powers or power stages, for example <0 W, 200 W, . . . , 800 W>.

In one embodiment, the at least one electric radiant heating body comprises at least two radiant heating bodies and the set of setting values comprises setting values for at least two of the radiant heating bodies. In other words, it is possible in order to implement the method for different power distributions to be used that correspond to different sets of setting parameters of at least two radiant heating bodies.

In one development, the radiant heating bodies can be operated separately or individually and namely in particular irrespective of whether multiple radiant heating bodies are operated together in the case of a selection of a specific operating mode (for example grill operating mode). This provides the advantage that it is possible to provide power distributions that are coordinated particularly effectively toward achieving a desired distribution of the surface characteristic.

In one development, the radiant heating bodies can be activated (in particular only) as functional "operating mode" groups or heating modes that are allocated to specific operating modes. In this case, in one variant in the case of at least one operating mode it is possible to activate precisely one radiant heating body or precisely one radiant heating body is allocated to this operating mode. In at least one other operating mode, at least two radiant heating bodies are activated or at least two radiant heating bodies are allocated to this other operating mode. The local power distributions that are predetermined for comparison in step b) can then be provided from the power inputs of radiant heating bodies that are associated with various operating modes.

The microwave facility can comprise for example a microwave generator, a microwave guiding arrangement for guiding microwaves, which are produced by means of the microwave generator, into the cooking compartment, where applicable at least one—in particular rotatable—antenna and where applicable at least one frequency modulator. The at least one setting parameter of the microwave facility can comprise for example one or multiple of the following setting parameters: microwave power, power distribution, microwave frequency, modulation of the microwave frequency, rotational angle of the at least one antenna, height position of the at least one antenna, rotational angle of the at least one frequency modulator, height position of the at least one frequency modulator. The so-called mode image and therefore the power distribution in the cooking compartment therefore changes with the changing angle position of the rotatable antenna. The microwave generator is advantageously an inverter-controlled microwave generator and/or a semiconductor-based microwave generator (solid state generator).

One possible setting parameter of the radiant-oriented cooling air blower can comprise its rotational speed. It is therefore possible to set a location-dependent cooling arrangement of specific regions of the food to be cooked. In particular, the cooling air blower can be configured so as to introduce a locally-limited, oriented ("radiant oriented") cooling air flow into the cooking compartment. It is possible to allocate at least one nozzle or flap in a cooking compartment wall to the cooling air blower for this purpose.

The radiant-oriented hot air facility can orient a flow of hot air in a targeted manner locally onto the food to be cooked. The hot air facility can be embodied for example as a so-called "air impingement" facility that has one or multiple nozzles for introducing a locally-limited, oriented hot air flow into the cooking compartment. Such nozzles can have for example a diameter of 5 mm.

A "water supplying facility" can be understood for example as a steam producer or a spraying apparatus for targeted introduction of spraying mist, water vapor or superheated steam into the cooking compartment, in particular directly onto the food to be cooked. Possible setting parameters can comprise for example a steaming duration and/or spraying duration, a target location for the water vapor, superheated steam and/or spraying mist, an application duration, etc. In particular, it is possible by spraying specific regions of the food to be cooked to achieve a location-dependent cooling effect.

In one embodiment, at least one power distribution that is known in advance is only determined for one set of setting values of the at least two radiant heating bodies and for example do not take into account operation of the microwave facility even in the event of such a microwave facility being provided. As a consequence, the advantage is achieved that the method can also be implemented using a simple oven without further additional functions such as a microwave function, etc. or for preparing recipes that frequently do not describe microwave operation.

However, power distributions that are known in advance can be provided in order to implement the method even only taking into consideration the setting parameters of the induction coils, the microwave generator etc.

In one embodiment, the steps a) to c) are performed cyclically. As a consequence, it is possible to check the current surface condition and where applicable it is possible to implement a correction of said surface condition multiple times to a desired surface condition by changing the distribution of the energy or power that is introduced during a cooking sequence in order to achieve the desired surface condition in a particularly effective manner.

A predetermined period of time $\Delta t$ in the case of a cyclical repetition of the method between a step c) and the following repeated implementation of step a) can essentially be selected arbitrarily. The period of time is however measured expediently in such a manner that in step a) effects of the operation of the elements for introducing energy can be specified in accordance with the set of setting values that are set in the preceding step c). The time duration $\Delta t$ can lie in the region of seconds or minutes, for example can be one second, ten seconds, 30 seconds, one minute, two minutes, etc. The time duration $\Delta t$ can be fixed or variable. In order to advantageously avoid unnecessary settings of new sets of setting parameters at the start of a cooking procedure if the food to be cooked is still barely browned but in order to take into account rapid browning changes during a well-advanced treatment duration, it is advantageous if the time duration $\Delta t$ is shortened with advancing treatment duration. The time duration $\Delta t$ can also be referred to as the cycle duration.

A cooking sequence or cooking section that uses the method can be terminated with the occurrence of at least one incident, for example achieving a predetermined cooking duration, termination of the cooking sequence by the user, achieving a target surface condition such as a maximum or average target degree of browning, etc.

In one development, at the start of a cooking sequence a specific first set of setting values is predetermined and the elements for introducing energy are initially operated in accordance with this starting set of setting values. The starting set can be fixedly predetermined or can be dependent upon the type of the food to be cooked, the target cooking compartment temperature, etc.

In one embodiment, the at least one sensor comprises at least one optical sensor and/or at least one infrared sensor. It is therefore possible to particularly reliably determine and effectively evaluate a surface condition. The optical sensor is particularly suitable for determining a degree of browning and/or for determining the moisture on the surface of the food to be cooked while the infrared sensor is particularly suitable for determining a temperature distribution on the surface of the food to be cooked. The infrared sensor is in particular sensitive in a near infrared range (NIR).

In one development, a spatially resolved, in particular pixel-type, distribution of the surface condition is provided from the measured values of the at least one sensor, in particular as a two-dimensional image. At least one sensor can be a spatially-resolving measuring sensor for this purpose. This renders it possible in an advantageous manner to implement the method in a particularly rapid manner. Alternatively or in addition, it is possible to move at least one sensor relative to the food to be cooked (for example by means of fastening on a movable carrier) and to perform measurements at different spatial positions and said measurements are merged to form an overall image. The advantage is therefore achieved that it is possible to completely detect or to survey the surface in particular even of voluminous or non-flat food to be cooked. Alternatively or in addition, it is also possible to use multiple sensors that are oriented at different viewing angles and/or at different positions in the cooking compartment and the measurements of said sensors can be merged for example to form an overall image.

The predetermined power distributions can likewise be defined or provided as two-dimensional, in particular horizontally-oriented planes. In general, the power distributions for a specific set of setting values can be provided as levels ("level bands") that are allocated to different height positions in the cooking compartment. It is possible then for a specific height position or level (or in general for an arbitrary spatial orientation) to provide two-dimensional representations of different sets of setting values for a specific height position. The height position advantageously corresponds to at least approximately the height position of the food to be cooked.

In addition or as an alternative, it is also possible for the food to be cooked to be moved in order to measure its surface characteristic(s). The food to be cooked can therefore be placed on a rotary plate. In addition or as an alternative, the food to be cooked can be height-adjustable in the cooking compartment, for example by an—in particular motorized—height-adjustable holding arrangement for a carrier of food to be cooked or by a height-adjustable carrier of food to be cooked. The height adjustment of the food to be cooked is provided in particular automatically by the household cooking appliance.

In one development, the at least one optical sensor comprises or is a digital camera. This is advantageously a color camera, but it can also be a black-and-white camera.

In one development, the at least one infrared sensor comprises or is at least one IR camera (also referred to as a thermal imaging camera). The infrared sensor however additionally or as an alternative can be embodied as at least one so-called thermopile, etc. The at least one infrared sensor can be embodied as an IR spectroscope.

In one development, the at least one unit for treating the food to be cooked has at least two radiant heating bodies (in particular tubular heating bodies) and at least one optical digital camera for determining a distribution of the degree of browning of the food to be cooked, wherein
a) a pixel-type constructed image of the food to be cooked is captured which shows the local distribution of the degree of browning of the food to be cooked. The distribution of the degree of browning can be provided for example as a two-dimensional pixel field having the brightnesses as pixel values,
b) a respective measure of deviation is calculated from the measured distribution of the degree of browning and multiple local power distributions, which are known in advance, of the radiant heating bodies in the region of the food to be cooked, wherein the power distributions that are known in advance correspond to different sets of setting values of the radiant heating bodies. The power distributions of the radiant heating bodies are also advantageously provided as a two-dimensional value field, wherein the individual values correspond to the local powers. Advantageously, the two-dimensional value fields have the same number and arrangement of value points as the two-dimensional pixel field, and
c) the radiant heating bodies are operated using the set of setting values of the power distribution that has a maximum measure of deviation, in other words the power deviation that differs to a maximum extent from the distribution of the degree of browning.

The above development can be performed additionally or alternatively using at least one thermal imaging camera so as to determine a surface temperature distribution of the food to be cooked, wherein then the distribution of the surface temperature can be provided for example as a two-dimensional pixel field having the local temperatures as pixel values.

In general, in the case of the pixel-type distributions it is possible to calculate the comparative summation from a multiplication of the values of the locally corresponding pixels of the two distributions that are to be linked, (pixel by pixel multiplication) and subsequent addition of the previously multiplied values. The difference value can be calculated from the amount of the difference of locally corresponding pixel values of the distributions that are to be linked and subsequent addition of the difference values.

However, the measure of deviation can also be calculated from other values that correspond to linkages of the two distributions that are to be linked, for example according to the least squares method and many more.

In one embodiment, a position of the food to be cooked or its surface is determined in the cooking compartment and only the power distributions and measured distributions or part regions thereof which relate locally to this position are used in order to implement the method. The advantage is therefore achieved that measured values of the surface of the food to be cooked can be separated from measured values of other surfaces and as a consequence it is possible to considerably reduce and even where applicable to completely exclude the influence of the other surfaces on the method. The image evaluation can be performed with the aid of an optical image and/or a thermal image.

The term "position" can be understood below in particular as at least one position value and/or as an expansion of the food to be cooked in the cooking compartment. The term "expansion" can be understood as a spatial expansion and/or an expansion in at least one specific spatial direction (for example in the height direction and/or lateral direction). The expansion can for example correspond to a contour-like expansion ("outer contour") or a maximum expansion. It is possible by this embodiment to achieve the advantage that the local power distributions can be particularly precisely adapted to the surface of the food to be cooked. In particular, in this case it is taken into consideration that the power distribution can vary in dependence upon the position of the food to be cooked in the cooking compartment. In the method, in other words the measured distribution is only compared with the power distributions in the region of the food to be cooked or the position of the food to be cooked. It is therefore possible for example for only image regions which include the food to be cooked to be evaluated and compared with one another.

In one development, the position, in particular also expansion, of the food to be cooked or its surface is determined by an image evaluation. The surface of the food to be cooked can therefore be differentiated from other surfaces in the cooking compartment such as a carrier of the food to be cooked and/or walls of the cooking compartment (also referred to as a muffle). In particular, the advantage is provided that measured values of the surface of the food to be cooked can be particularly easily separated from measured values of other surfaces. The image evaluation can be performed with the aid of an optical image and/or a thermal image.

In one development, the image evaluation comprises an object recognition procedure of the food to be cooked. This renders it possible to particularly precisely automatically determine the position of the food to be cooked.

The position or expansion of the surface of the food to be cooked in the cooking compartment alternatively or in addition can be determined by an evaluation of spectral (optical and/or thermal) changes at the start of the cooking process. The surface of the food to be cooked is in general therefore heated slower than a typical metal carrier of food to be cooked, which is apparent in an image sequence and can be evaluated. Alternatively or in addition, chronological changes in the wavelength-dependent reflection can be evaluated.

Alternatively, the position of the food to be cooked can be determined in another manner, for example by the user. For example, in one development an optical image of the cooking compartment can be captured and can be provided to a user for inspection, for example can be displayed on a touch-sensitive screen, for example of the household cooking appliance and/or a user terminal such as a smartphone or tablet PC. The user can then determine the image surface that corresponds to the food to be cooked. This can be provided for example by moving along the contour of the food to be cooked, which is identified by the user, by means of a finger or pen on the touch-sensitive screen. Alternatively, the image that is captured can be divided visually into segments and a user can select the segments that the food to be cooked is displayed in, in particular that the food to be cooked is predominantly displayed in, in particular that only the food to be cooked is displayed in. The household cooking appliance can subsequently only use the segments that are selected by the user in order to implement the method.

One further development is that the height position is determined by determining an insertion level of a carrier of the food to be cooked that is carrying the food to be cooked (grille, baking sheet etc.). In this case, the height of the insertion level or the height of the insertion level in addition to a determined height ("additional height") can be determined as the height of the food to be cooked. For example, if it is known that the food to be cooked is pizza, the height of the insertion level can be added to an additional height of 1 cm, in the case of a casserole for example 3 cm, etc.

In one embodiment, a position of the food to be cooked is determined and the predetermined power distributions are adapted to the determined position of the food to be cooked. In this case, the position of the food to be cooked can be determined once at the start for the method and then is taken for granted for the duration of the method, in particular for multiple cycles. Alternatively, the position, in particular expansion, of the food to be cooked can be determined multiple times during the method, for example for each cycle or after each n-th, n>1, cycle. The advantage is therefore achieved that the power setting can be adapted particularly precisely to the current position of the surface of the food to be cooked, for example in that only the power distributions that at least approximately correspond to the determined position of the food to be cooked are taken into consideration during the implementation of the method. This is particularly advantageous for food to be cooked that noticeably changes in shape during the treatment, for example cake or bread.

In one embodiment, the height position of the food to be cooked can be varied. This provides the advantage that the position of the food to be cooked can therefore be adapted to particularly advantageous power distributions. In this case, use is made of the fact that units for treating the food to be cooked introduce a more homogeneous or inhomogeneous power distribution into the cooking compartment in dependence upon the distance of said unit for treating the food to be cooked with respect to the food to be cooked. Usually, the power distribution in this case is more inhomogeneous the smaller the distance. If it is known for example or is assumed that a desired—in particular greatest—deviation can be achieved more effectively using power distributions that are provided in a more inhomogeneous manner, it is advantageous to position the food to be cooked closer to at least one unit for treating the food to be cooked. If the at least one unit for treating the food to be cooked is located in the region of a ceiling of the cooking compartment (which for example is typical for an arrangement of an upper heat heating body and a grill heating body), the food to be cooked can be brought for example by height adjustment closer in the direction of the ceiling than originally provided. One development is therefore that the height position of the food to be cooked can be set so as to positionally coincide with a determined group of predetermined power distributions that is adapted to a target height position of the food to be cooked.

The variation of the height position can be performed automatically by the household cooking appliance (for example by actuation of a height adjusting facility of a carrier for the food to be cooked or for a carrier for the food to be cooked) and/or said variation can be performed manually by a user, for example after the output of a corresponding instruction to the user.

In general, the method can also be implemented if multiple items of food to be cooked or dishes are simultaneously located in the cooking compartment. The method can then be implemented while taking into consideration only one item of food to be cooked, a part quantity of the items of food to be cooked or for all the items of food to be cooked. For the case that the method is to be implemented while taking into consideration multiple items of food to be cooked, the measure of deviation can be determined so that the in each case desired at least one (target) distribution of the surface characteristic(s) for all the items of food to be cooked that are to be taken into consideration is approximated as much as possible. In one example, a respective, as uniform as possible, degree of browning on the surface of items of food to be cooked is to be achieved for multiple items of food to be cooked, wherein in one variant different items of food to be cooked can have different target degrees of browning. The procedure for determining the measure of deviation is performed during joint examination of the pixels of all the items of food to be cooked that are taken into consideration. If different target degrees of browning are desired for different items of food to be cooked, the measure of deviation and/or the associated set of setting values can be adapted to said different target degrees of browning. For example, a lower power can be applied to items of food to be cooked that are to be browned less and/or that require a comparatively lower power to be introduced in order to achieve their target degree of browning than other items of food to be cooked, than to regions that are to be browned more intensely. This can be set for example by means of a suitable weighting distribution. This embodiment can be adapted in a similar manner to other surface characteristics (for example a surface temperature, etc.) and/or to other desired (target) distributions of the at least one surface characteristic of the multiple items of food to be cooked.

This consideration of different target degrees of browning for different regions of food to be cooked in the cooking compartment can be applied while implementing the method in a similar manner on at least one item of food to be cooked, the surface of which is to receive an inhomogeneous distribution of its surface characteristic(s), for example a predetermined non-homogeneous distribution of browning. The surface of the food to be cooked can then be divided (for example automatically or by a user) into different part regions or segments and then the method can be implemented taking into consideration different target surface characteristics. For example, a lower power can be applied to part regions of the food to be cooked that are to be browned less and/or that require a comparatively lower power to be introduced to achieve their target degree of browning than other part regions, than to part regions that are to be browned more intensely. This can be set for example by means of a suitable weighting distribution. This embodiment has the advantage that also for this purpose it is possible to use a greatest deviation as a criterion for the measure of deviation in order to select a suitable power distribution.

The object is also achieved by a household cooking appliance that is configured for the purpose of allowing the above-described method to be implemented. The household cooking appliance can be embodied in a similar manner to the method and has the same advantages.

In particular, the household cooking appliance can have a cooking compartment, at least one unit for treating the food to be cooked, at least one sensor for determining at least one surface condition of the food to be cooked, at least one evaluating facility and a control facility for controlling the at least one unit for treating the food to be cooked in accordance with the setting values.

In one embodiment, the evaluating facility is configured for the purpose of implementing at least step b) of the method. Step c) is in particular performed by means of the control unit. The control unit can also trigger step a).

In general, the evaluating facility and the control facility can be integrated into a functional unit. The control facility can therefore also be used or can be configured as an evaluating facility.

BRIEF DESCRIPTION OF THE DRAWINGS

The above-described characteristics, features and advantages of this invention and also the manner in which these are achieved become clearer and more explicit in conjunction with the following schematic description of an exemplary embodiment that is further explained in conjunction with the drawings.

DETAILED DESCRIPTION OF EXEMPLARY EMBODIMENTS OF THE PRESENT INVENTION

Figure 1:
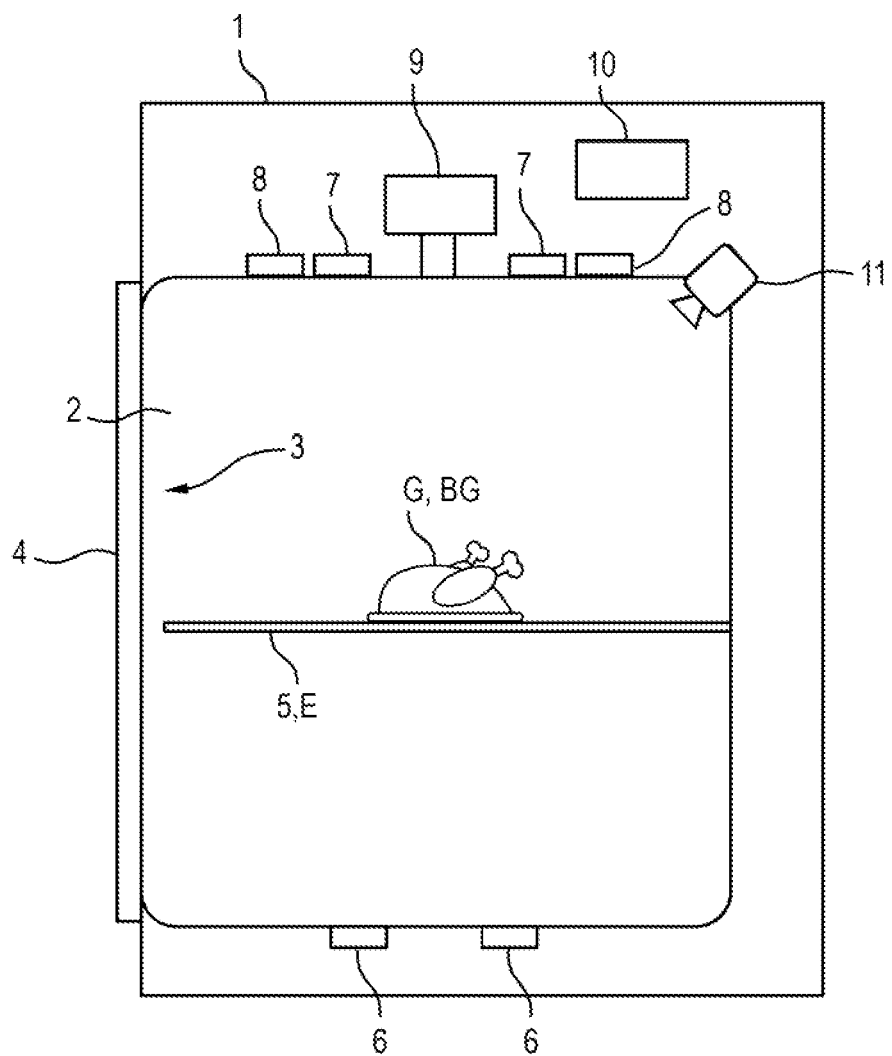
FIG. 1 shows as a sectional view in a side view a diagram of a household cooking appliance that is configured so as to implement the above-described method.
Figure 2:
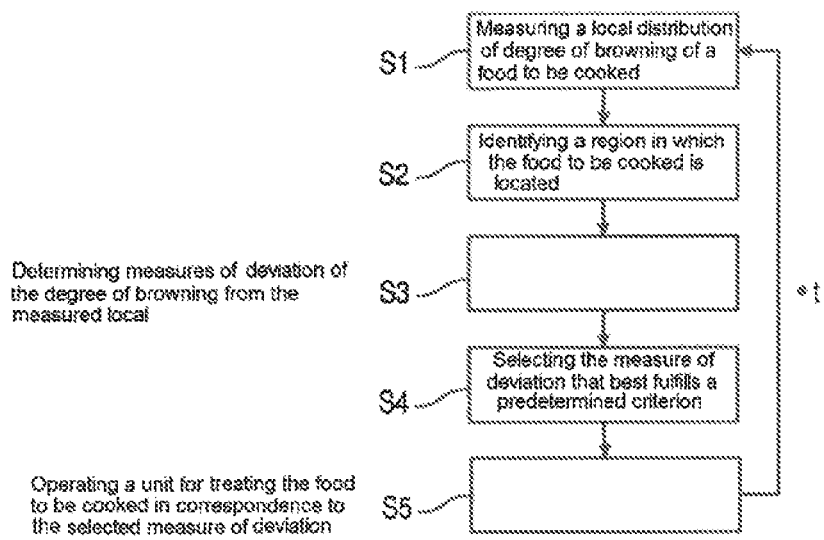
FIG. 2 shows a method sequence for implementing the above-described method on the household cooking appliance.

FIG. 1 illustrates as a sectional view in a side view a diagram of a household cooking appliance 1 that is configured so as to implement the method that is described in detail in FIG. 2. The household cooking appliance 1 has a cooking compartment 2 having a front-side loading hatch 3 that can be closed by means of a door 4. Food to be cooked G is arranged in the cooking compartment 2 on a carrier 5 for food to be cooked. The carrier 5 for food to be cooked is arranged at one of multiple possible insertion levels E. The household cooking appliance 1 can be configured for the purpose of automatically determining which insertion level E is occupied.

The household cooking appliance 1 moreover has multiple units for treating food to be cooked in the form of IR radiant heating bodies 6 to 8, namely a bottom heat heating body 6 that is marked here as annular, an annular marked upper heat heating body 7 and an annular marked grill heating body 8.

In addition or as an alternative, a unit for treating the food to be cooked can be provided in the form of a microwave generating facility 9. The microwave generating facility 9 can have for example an inverter-controlled microwave generator, a rotationally-adjustable and/or height-adjustable antenna and/or a rotationally adjustable and/or height adjustable frequency modulator (not illustrated).

The units 6 to 9 for treating the food to be cooked are controlled by means of a control unit 10. The control unit 10 is moreover connected to an optical sensor in the form of a digital camera 11. The digital camera 11 is arranged in such a manner that it is oriented into the cooking compartment 2 and can capture an image of the food to be cooked G. As a consequence, the digital camera 11 can be used so as to determine a degree of browning BG of the food to be cooked G as the surface condition.

The control unit 10 can moreover be configured so as to implement the above-described method and can also be used for this purpose as an evaluating facility. Alternatively, the evaluation can also be performed on an instance that is external to the appliance such as a network computer or the so-called "cloud" (not illustrated).

FIG. 2 illustrates a method sequence for implementing the method on the household cooking appliance 1 under the exemplary assumption that the household cooking appliance 1 does not have a microwave generating facility 9 or does not use this microwave generating facility, for example because it is deactivated. It is also assumed that only one item of food to be cooked G is located in the cooking compartment 2.

In one step S1, a local distribution of the degree of browning BG of the food to be cooked G is measured by virtue of the fact that the digital camera 11 captures an image of the food to be cooked G.

In a second step S2, an object recognition procedure is performed by means of the control unit 10 in the image that is captured by the digital camera 11 and as a consequence, the image region that corresponds to the food to be cooked G or that the food to be cooked is located in is identified.

In a third step S3, the distribution of the degree of browning, which is measured for the image region of the food to be cooked G, is linked for the same region having local power distributions that are known in advance (for example heat inputs) in that for this image region a measure of deviation is determined in the form for example of a comparative summation or a difference value. In this case, the local power distributions that are known in advance correspond to different sets of setting values of the radiant heating bodies 6 to 8 in the region of the food to be cooked G. In this case, the knowledge of the insertion level E and where applicable the type of the food to be cooked G (for example chicken, pizza etc.) can be used for the purpose of using the local power distributions that are known in advance for the as a consequence at least approximately known height of the food to be cooked G in the cooking compartment 2.

The power distributions can be provided for example as two-dimensional, in particular horizontally-oriented sectional planes through the cooking compartment 2. In general, the power distributions can be provided for a determined set of setting values as levels ("level bands") that are allocated to different heights.

In a fourth step S4, the measure of deviation having the value that best fulfills the predetermined criterion, for example that expresses a greatest difference between the measured distribution and the power distribution, is selected from the values of the measures of deviation that are determined previously for the different power distributions. This power distribution is the power distribution that, if it is input into the cooking compartment 2, treats the food to be cooked G most effectively in the direction of a uniform distribution of browning. The selected value can be for example the smallest value of a comparative summation or the highest value of a difference summation.

In a step S5, the radiant heating bodies 6 to 8 are operated using the set of setting values of the power distribution that corresponds to the selected value of the measure of deviation.

The steps S1 to S5 can be repeated with a cycle duration $\Delta t$.

Figures 3A, 3B:
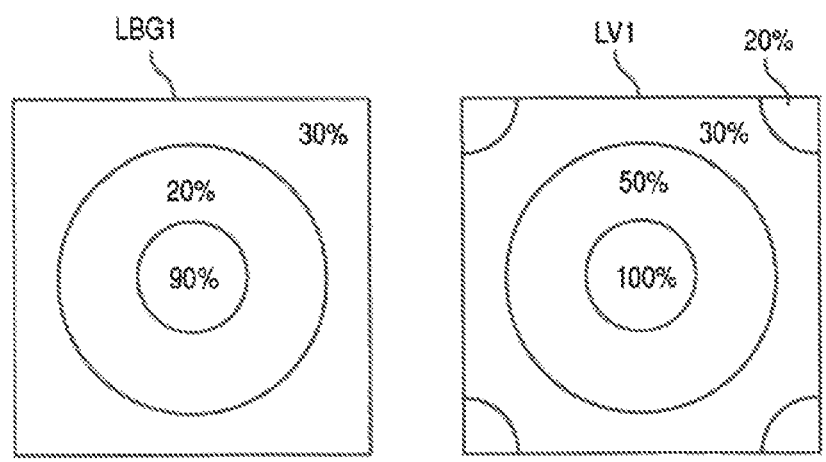
FIG. 3A to 3E shows various measured distributions and power distributions that are associated with the method.

FIG. 3A illustrates a first measured distribution LBG1 of the degree of browning BG of the food to be cooked G in percent. In this case, a value of 100% can correspond for example to a maximum measured degree of browning BG or as illustrated to a target degree of browning BG.

FIG. 3B illustrates a power distribution LV1 that is associated with the insertion level E or with the height of the food to be cooked G at the site or at the position of the food to be cooked G for a set of setting values in which only the bottom heat heating function and the upper heat heating function are activated, but the grill heating body 8 is switched off (setting value=0).

Figure 3C:
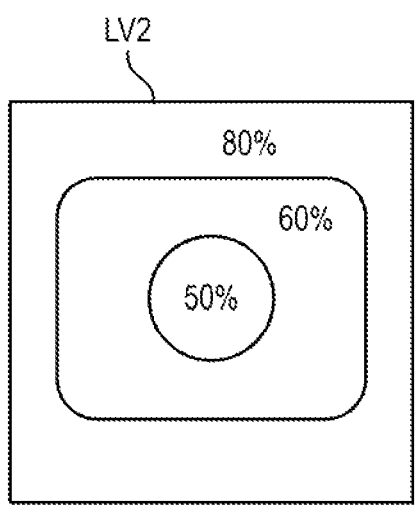

FIG. 3C illustrates a power distribution LV2 that is associated with the insertion level E or with the height of the food to be cooked G at the site or at the position of the food to be cooked G for a set of setting values in which the grill heating body 8 is now also activated. The form of the power distribution LV2 differs from the measured distribution LBG1 of the degree of browning BG to a greater extent than the power distribution LV1.

It is provided by the method that is described in FIG. 2 that the measure of deviation of the power distribution LV2 provides a greater deviation than the measure of deviation of the power distribution LV1. Consequently, in step S5 the radiant heating bodies 6 to 8 would be operated using the set of setting values that is associated with the power distribution LV2.

Figure 3D:
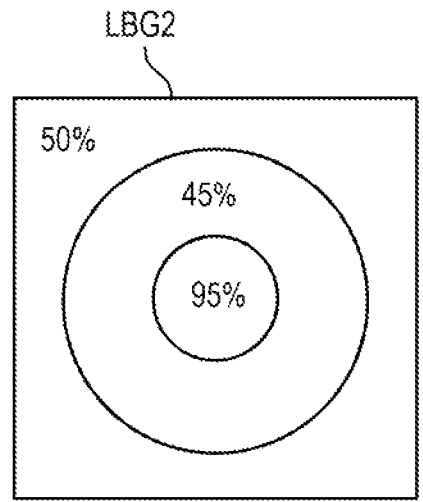

FIG. 3D illustrates a second measured distribution LBG2 of the degree of browning BG of the food to be cooked G in percent after the food to be cooked G was exposed to the power distribution LV2 for a specific time period (for example the cycle time Δt). As a consequence, the degree of browning BG of the food to be cooked G has been standardized, which comes closer to a desired cooking result of a homogeneous distribution of the degree of browning BG on the surface of the food to be cooked 2 than the distribution of the degree of browning LBG1 in FIG. 3A.

Figure 3E:
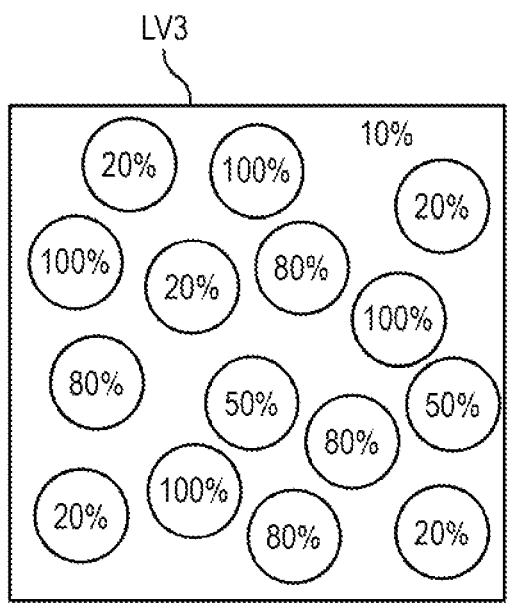

FIG. 3E discloses a further possible power distribution LV3 that has been produced by means of a radiation of microwaves by the microwave generating apparatus 9 in the cooking compartment 2.

Obviously, the present invention is not limited to the illustrated exemplary embodiment.

In general, "a", "an" etc. can be understood as singular or a plurality, in particular in the sense of "at least one" or "one or more" etc., as long as this is not explicitly ruled out, for example by the expression "precisely one" etc.

The disclosure of a numerical value can also comprise precisely the disclosed numerical value as well as a customary tolerance range as long as this is not explicitly ruled out.

The invention claimed is:

1. A method for treating food to be cooked in a household cooking appliance, the method comprising:
   measuring by a sensor a local distribution of a degree of browning of the food to be cooked;
   calculating a respective measure of deviation between the measured local distribution and each one of multiple local power distributions that are known in advance in the region of the food to be cooked, wherein each of the multiple local power distributions corresponds with different sets of setting values of a unit for treating the food to be cooked; and
   operating the unit for treating the food to be cooked using the set of setting values of the one of the local power distributions for which the respective measure of deviation fulfills a predetermined criterion.

2. The method of claim 1, wherein the predetermined criterion corresponds to a greatest deviation between the measured local distribution and the multiple local power distributions.

3. The method of claim 1, wherein the measure of deviation is a comparative summation or a difference value between the measured local distribution and the multiple local power distributions.

4. The method of claim 1, wherein the unit for treating the food to be cooked is a member selected from the group consisting of an electric radiant heating body, an induction coil, a microwave facility, a radiant-oriented cooling air blower, a radiant-oriented hot air facility, and a radiant-oriented water supplying facility.

5. The method of claim 1, wherein the unit for treating the food to be cooked is an electric radiant heating body comprising at least two radiant heating bodies, with the set of setting values comprising setting values for at least two of the radiant heating bodies.

6. The method of claim 5, wherein one of the at least two radiant heating bodies provides a bottom heating function, and another of the at least two radiant heating bodies provides an upper heating function.

7. The method of claim 5, further comprising determining the one of the power distributions that is known in advance only for a set of setting values of the at least two radiant heating bodies.

8. The method of claim 1, further comprising executing the steps cyclically.

9. The method of claim 1, wherein the sensor comprises an optical sensor or an infrared sensor.

10. The method of claim 1, wherein the predetermined criterion is based on providing the food to be cooked with either a uniform distribution or a predetermined non-uniform distribution of the degree of browning.

11. The method of claim 1, further comprising:
    determining a position of the food to be cooked in a cooking compartment; and
    using only the local power distributions that relate to said position to calculate the measure of deviation.

12. The method of claim 1, wherein the local distribution of the degree of browning is measured by the sensor for multiple items of food to be cooked, with the measure of deviation for the items of food to be cooked being calculated jointly from the measured distribution of the degree of browning and the multiple local power distributions that are known in advance in the region of the items of food to be cooked, and with the unit for treating the food to be cooked being operated using the set of setting values of the one of the power distributions for which the measure of deviation fulfills the predetermined criterion.

13. The method of claim 1, wherein the measure of deviation is calculated for different part regions of the food to be cooked having different target values of the degree of browning from the measured local distribution of the degree of browning and the multiple local power distributions that are known in advance, with the unit for treating the food to be cooked being operated using the set of setting values of the one of the power distributions for which the measure of deviation fulfills the predetermined criterion.

14. The method of claim 1, further comprising:
    determining a position of the food to be cooked; and
    adapting the known power distributions to the determined position of the food to be cooked.

15. The method of claim 1, further comprising adapting a height position of the food to be cooked to a group of known ones of the power distributions which group matches said height position.

16. A household cooking appliance, comprising:
    a cooking compartment;
    a unit for treating a food to be cooked in the cooking compartment;
    a sensor for determining a local distribution of a degree of browning of the food to be cooked; and a control facility operably connected to the sensor and configured to calculate a respective measure of deviation between the local distribution and each of multiple local power distributions that are known in advance in the region of the food to be cooked, wherein each of the multiple local power distributions corresponds in correspondence with different sets of setting values of the unit for treating the food to be cooked, and to operate the unit for treating the food to be cooked using the set of setting values of the one of the local power distributions for which the respective measure of deviation fulfills a predetermined criterion.

17. The household cooking appliance of claim 16, wherein the unit for treating the food to be cooked is a member selected from the group consisting of an electric radiant heating body, an induction coil, a microwave facility, a radiant-oriented cooling air blower, a radiant-oriented hot air facility, and a radiant-oriented water supplying facility.

18. The household cooking appliance of claim 16, wherein the unit for treating the food to be cooked is an electric radiant heating body comprising at least two radiant heating bodies, with the set of setting values comprising setting values for at least two of the radiant heating bodies.

19. The household cooking appliance of claim 18, wherein one of the at least two radiant heating bodies provides a bottom heating function, and another of the at least two radiant heating bodies provides an upper heating function.

20. The household cooking appliance of claim 16, wherein the sensor comprises an optical sensor or an infrared sensor.

* * * * *